(12) United States Patent
Naderer (10) Patent No.: US 6,508,303 B1
(45) Date of Patent: Jan. 21, 2003

(54) AIR SUPPLY CONTROL DEVICE

(75) Inventor: James P. Naderer, Plain City, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/460,141

(22) Filed: Dec. 13, 1999

(51) Int. Cl.[7] .............................. G05D 23/00; F24F 3/14
(52) U.S. Cl. ...................... 165/299; 165/222; 165/287; 236/91 C; 236/91 F; 236/44 C
(58) Field of Search ................................ 165/287, 260, 165/263, 11.1, 299, 228, 229, 222, 223; 236/49.3, 91 C, 91 F, 91 R, 44 C; 62/228.4

(56) References Cited

U.S. PATENT DOCUMENTS

| | | | | |
|---|---|---|---|---|
| 4,750,545 A | * | 6/1988 | Hile et al. ............... | 165/228 X |
| 4,862,950 A | * | 9/1989 | Gribble et al. ............... | 165/229 |
| 4,974,665 A | * | 12/1990 | Zillner, Jr. ................... | 165/229 |
| 5,135,045 A | * | 8/1992 | Moon .......................... | 165/260 |
| 5,330,265 A | | 7/1994 | Keating, Jr. et al. | |
| 5,353,862 A | * | 10/1994 | Akiyama ..................... | 165/229 |
| 5,538,471 A | | 7/1996 | Guiles, Jr. | |
| 5,632,333 A | * | 5/1997 | Imamura et al. ......... | 165/229 X |
| 5,845,599 A | | 12/1998 | Bova et al. | |
| 5,851,293 A | | 12/1998 | Lane et al. | |
| 5,901,905 A | * | 5/1999 | Jung ....................... | 165/229 X |
| 5,984,002 A | * | 11/1999 | Kido et al. ............. | 165/230 X |
| 6,079,483 A | * | 6/2000 | Morooka et al. ....... | 165/229 X |
| 6,434,960 B1 | * | 8/2002 | Rousseau .................. | 62/228.4 |

OTHER PUBLICATIONS

US 5,878,691, 3/1999, Ludington et al. (withdrawn)

* cited by examiner

Primary Examiner—Ljiljana Ciric
(74) Attorney, Agent, or Firm—Standley & Gilcrest LLP; Alan T. McDonald; Vince Ciamacco (57) ABSTRACT

An air supply control device for use in the heating, cooling, and conditioning of an air supply to a predetermined temperature. The device includes a cooling unit that is adapted to cool the air passing through the unit. The device incorporates a variable speed cooling fluid pump that pumps cooling fluid through a heat exchanger in the cooling unit, and a variable frequency drive ("VFD") that is electrically connected to the pump and which can vary the speed of the pump. The device also incorporates a temperature sensor that is positioned to detect the temperature of the air after it has passed through the cooling unit. A programmable logic controller ("PLC") is included in the device and is in electronic communication with the temperature sensor and the VFD. The PLC is programmed to vary the speed of the cooling fluid pump to adjust the temperature of the air passing through the cooling unit to the predetermined temperature.

14 Claims, 8 Drawing Sheets

AIR SUPPLY CONTROL DEVICE

TECHNICAL FIELD

This invention relates to devices and methods for controlling the temperature and humidity of an air supply for an environmentally controlled industrial and/or manufacturing facility that requires a continuous supply of air that meets predetermined parameters.

BACKGROUND OF THE INVENTION

In various industries, the overhead costs typically associated with heating, cooling, and conditioning of an air supply can be a significant portion of the overall facilities management budget. The costs are even more pronounced in the manufacturing industries where precise temperature and humidity controls must be established and continuously maintained to meet high-quality standards and to ensure the uninterrupted, round-the-clock flow of manufactured goods. In many manufacturing processes, including for example automotive assembly line coating, and painting processes, a large amount of energy is needed to carefully control and maintain the environment. The type of compounds and chemicals required to coat and paint automotive frames, panels, and bodies mandates precise, positive control and maintenance of the ambient environment. The types of substances used for coating and painting automobile frames, components, and panels have very specific temperature and humidity requirements to promote the optimum, non-anomalous application, drying, and curing times required by the coatings.

Ordinarily, the environmental control systems in use for certain parts of large manufacturing operations must be capable of supplying an environment with a continuous flow of clean air at a specific temperature and humidity. The air supply source is typically fresh, outside air, or recycled air. Such control systems often sacrifice energy efficiency in favor of a large capacity for heating, cooling, and conditioning, so that a treated air supply can be guaranteed despite the condition of the air supply source air flow. This capability for an uninterrupted supply of conditioned air is especially important in manufacturing operations that are run continuously and that use an unpredictable source of outside, ambient or recycled air as the incident air stream source. The use of either recycled or outside air can require that a large amount of energy be added or removed from the supply air to achieve the desired, precise air temperature and condition. Furthermore, considerable amounts of energy can be required to humidify or dehumidify outside to air to meet the desired humidity level.

Some attempts have been made to improve the energy efficiency of air supply control systems. Attempts to improve the energy efficiency of large-scale air supply systems have incorporated components such as specialized circulation and valve systems as well as variable frequency drives to vary fan speeds to decrease the energy consumption requirements of the air supply control system during times of reduced demand for conditioned air.

For example, efforts have been made to control the rate of air flow through a medical isolation control environment using many different types of subsystems, including heating, cooling, air flow rate, humidification, and filtering subsystems. However, these types of air supply control system are unnecessarily expensive and complicated to install, and inefficient for use in the large scale air supply systems needed for most automotive manufacturing processes. U.S. Pat. No. 5,538,471 is limited to a medical isolation environmental control system that includes many such subsystems and which also includes a variable frequency drive operative to control the air flow rate.

Other prior art devices have been directed to air control systems for use in the semiconductor manufacturing industries that are also unsuitable for use in automotive manufacturing operations. U.S. Pat. No. 5,851,293 is directed to a system that treats the effluent gases resulting from semiconductor manufacturing processes, which uses a variable frequency drive to modulate the flow of the hot effluent gas stream. The described effluent gas treatment capability is not be readily adapted for use in the automotive manufacturing processes, which require a higher volume, more energy efficient air supply system. Attempts to improve diary cow milking systems have included vacuum control systems that incorporate a variable frequency drive to control the vacuum level of an air reservoir included in the milking system. U.S. Pat. Nos. 5,878,691 and 5,845,599 are directed to these types of milking systems. However, these prior art milking control systems cannot be adapted for use in the automotive manufacturing processes taught by the instant invention.

None of the preceding references disclose or suggest the use of a variable frequency drive in the cooling unit of an air supply control system to control the rate of cooling of an air supply control system that includes a cooling unit, a heating unit, and a programmable logic controller configured to monitor the air supply temperature and to adjust it by activating the cooling and heating units.

What has been needed, but heretofore unavailable, is an improved, more energy efficient, environmental air supply control system that is compatible for use with the large scale air supply requirements commonly found in automotive manufacturing operations. As is well known, the automotive manufacturing industry is highly competitive in terms of minimizing operational costs. Every cost savings can often be directly passed through to the consumer in reduced automobile prices. Any reduction in the amount of energy consumed during the various manufacturing processes can result in large cost savings in light of the large economies of scale. This is especially true in automotive manufacturing processes that are in continuous operation throughout multiple daily shifts. Any manufacturing process that is inefficient or unnecessarily expensive because of an unnecessary waste of energy can result in the manufacturer suffering economically from the costs of the wasted energy resources. This economic loss may translate directly to higher prices and sales lost to competitors that have improved their manufacturing processes, saved on energy costs, and reduced the consumer price of competitive products.

The air supply control system of the present invention offers a solution to the problem of excessive energy consumption in the air supply control and conditioning systems. The inventive solution accomplishes this by reducing the number mechanical parts as compared with previous systems, and by improving the operational efficiency of, and by incorporating variable frequency drives to control critical cooling fluid flow through the air supply control system to optimize conditioning capability and minimize energy consumption.

SUMMARY OF THE INVENTION

In general, the present invention relates to an improved air supply control device for maintaining and supplying an airflow at a predetermined temperature. The device includes a cooling unit that is adapted to cool the air passing through the unit, which includes a variable speed cooling fluid pump that pumps cooling fluid through a heat exchanger in the cooling unit, and a variable frequency drive ("VFD") that is electrically connected to the pump and which can vary the speed of the pump. The device also incorporates a temperature sensor that is positioned to detect the temperature of the air after it has passed through the cooling unit. A programmable logic controller ("PLC") is included in the device and is in electronic communication with the temperature sensor and the VFD. The PLC is programmed to monitor the temperature of the air and to vary the speed of the cooling fluid pump to adjust the temperature of the air passing through the cooling unit to the predetermined temperature.

The present invention is also directed to an air temperature and humidity control device that is configured to maintain and supply an airflow at a predetermined temperature and humidity. The device includes a cooling unit that is operative to cool the air passing through the unit, and includes a variable speed cooling fluid pump that pumps cooling fluid through a heat exchanger in the cooling unit. A VFD is electrically connected to the cooling fluid pump and is adapted to vary the speed of the pump for changing the amount of fluid pumped through the heat exchanger. The control device further includes a temperature controller with a temperature sensor that is positioned inside the control device to detect the temperature of the air after it passes through the cooling unit. A PLC is also incorporated and it is in electronic communication with the temperature controller or sensor, or both, and the VFD, and is programmed to vary the speed of the cooling fluid pump to adjust the temperature of the air passing through the cooling unit to the predetermined temperature. The temperature and humidity control device also includes a humidity control unit positioned in the air flow that includes an air humidifier and a humidity sensor operative to adjust the humidity of the air flow if it deviates from the predetermined humidity. A heating unit may also be electronically coupled to the PLC and is operative to heat the airflow in response to signals from the PLC. Also, the PLC is programmed to delay adjustments to the VFD to change the speed of the cooling pump motor for an interval of time that allows the cooling unit to reach a stable heat exchange rate before additional changes are made by adjusting the speed of the pump motor. This feature accounts for the latency period required for the cooling unit, and the air flowing through it, to respond to previous changes.

The preceding embodiments of the present invention also contemplate a variation that includes a thermostat having a temperature selector configured to be set to the predetermined temperature. The PLC in this variation is in electronic communication with the thermostat, the temperature sensor, and the VFD, and it is programmed to vary the speed of the cooling fluid pump to adjust the temperature of the air passing through the cooling unit when the predetermined temperature is different from the temperature indicated by the temperature sensor.

In another variation of the preceding embodiments, the PLC is in electronic communication with the temperature sensor and the VFD, and it includes a temperature selector that is adapted to be programmed to the predetermined temperature. The PLC is programmed to vary the speed of the cooling fluid pump to adjust the temperature of the air passing through the cooling unit to the predetermined temperature set by the selector. Each of the preceding embodiments and variations also contemplate a PLC that is in electronic communication with a computer that is configured to monitor and reprogram the PLC.

The present invention is also directed to a VFD controlled air cooling unit for maintaining the temperature of an air flow supply at a predetermined temperature that includes a variable speed cooling fluid booster pump in fluid communication with a pressurized cooling fluid supply and a VFD in electronic communication with the pump and configured to vary the cooling fluid flow rate through the pump. This variation of the preceding embodiments of the invention also includes a temperature sensor positioned to detect the temperature of the air after it has passed through the cooling unit and a PLC adapted to communicate electronically with the temperature sensor and the VFD. The PLC is programmed to adjust the VFD to increase and decrease the speed of the cooling fluid pump to boost the cooling fluid pressure to maintain the temperature of the air passing through the cooling unit at the predetermined temperature.

In another variation of the preferred embodiments of the instant invention, there is disclosed an air supply control device for maintaining and supplying an airflow at a predetermined temperature. This variation incorporates a cooling fluid source that supplies pressurized cooled liquid and a cooling unit adapted to cool the air passing through the unit that includes a variable speed, cooling fluid boost pump in fluid communication with a check valve that is connected to the cooling fluid source. A VFD is also included that is electrically connected to the pump and adapted to vary its speed. The device further includes a temperature sensor positioned to detect the temperature of the air after it has passed through the cooling unit, and a PLC in electronic communication with the check valve, the temperature sensor, and the VFD and programmed to actuate the check valve and to vary the speed of the cooling fluid pump to adjust the temperature of the air passing through the cooling unit to the predetermined temperature.

The instant invention is also directed to a method for maintaining and supplying at a predetermined temperature an air flow moving through a cooling unit that incorporates a variable speed, cooling fluid pump motor controlled by a VFD responsive to a PLC programmed to sense the temperature indicated by a sensor positioned proximate to the flowing air and to adjust the pump motor speed to vary the cooling rate of the cooling unit. The method includes the steps of monitoring the temperature of the air flow leaving the cooling unit with the PLC detecting the temperature indicated by the sensor, and increasing the temperature of the air flow if it falls below the predetermined temperature wherein the PLC sends a signal to the VFD to decrease the speed of the variable speed cooling fluid pump to reduce the cooling rate of the cooling unit. The method also includes the step of decreasing the temperature of the air flow if it exceeds the predetermined temperature wherein the PLC sends a signal to the VFD to increase the speed of the variable speed cooling fluid pump to increase the cooling rate of the cooling unit.

BRIEF DESCRIPTION OF THE DRAWINGS

Without limiting the scope of the present invention as claimed below and referring now to the drawings, wherein like reference numerals across the several views refer to identical, corresponding, or equivalent features and parts:

DESCRIPTION OF THE PREFERRED EMBODIMENTS

Large-scale production manufacturers have long-sought to reduce the energy costs associated with the heating, cooling, and conditioning of the air needed for various manufacturing operations. The potential for cost savings is especially pronounced in the automotive manufacturing operations that include coating and painting of automobile frames, components, and body panels. These manufacturing processes require a steady volume or flow of heated, cooled, and conditioned air to adequately remove harmful fumes and to promote the proper curing and drying of the substances used for coating and painting. Although various efforts have been made in the past to improve the state of the art of air supply control devices, each type of device, or in some cases system, has drawbacks that render it incompatible for use in the automotive manufacturing processes contemplated by the instant invention.

Figure 1:
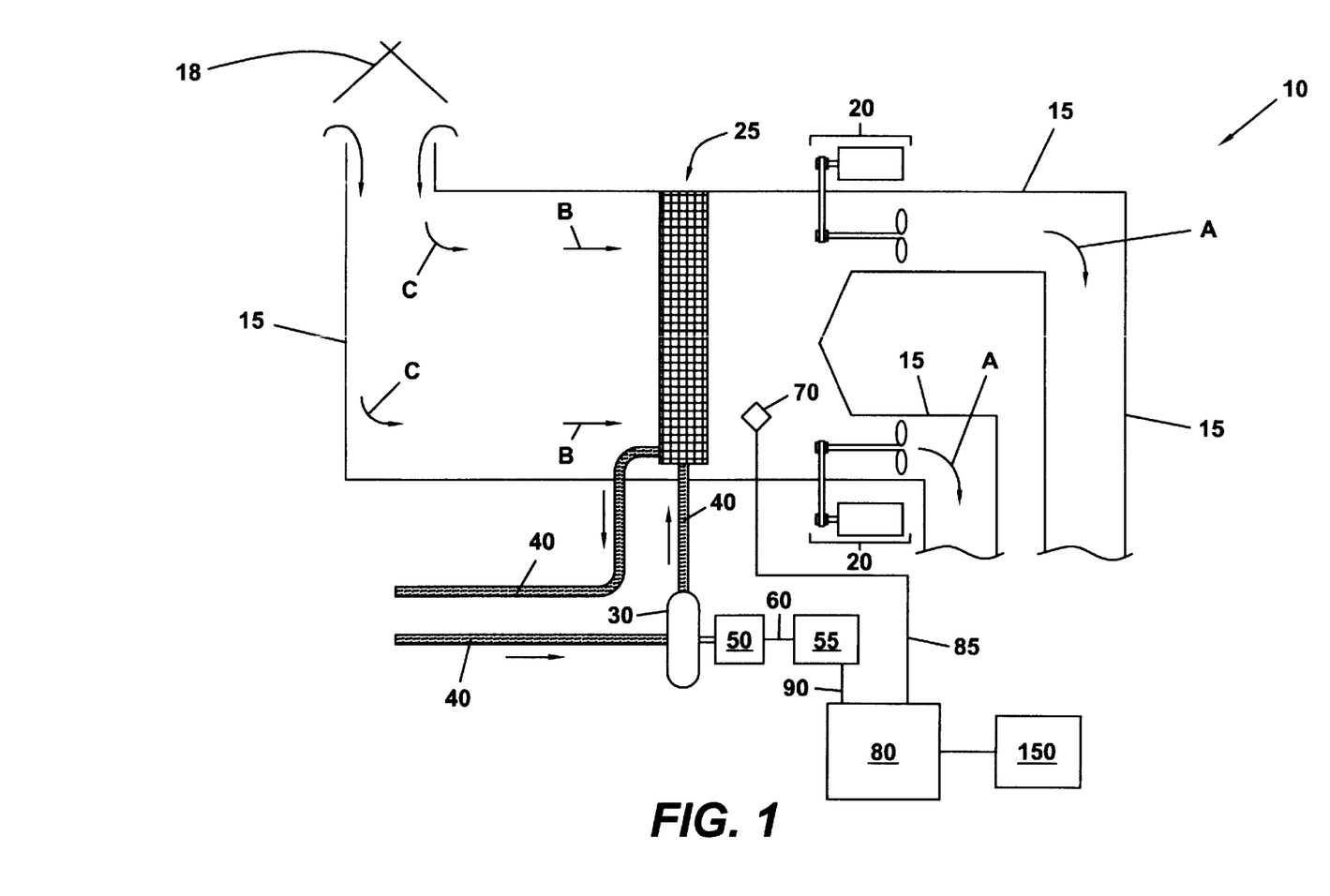
FIG. 1 is a schematic view, in reduced scale of an air supply control device according to the present invention, shown in cooling mode.

The present invention establishes a significant advance over the previously known air supply control devices and methods and results in substantial and sustainable energy efficiency and corresponding cost savings. With reference to FIG. 1, a schematic diagram of one embodiment of an air supply control device 10 of the present invention can be observed. Both a schematic depiction of one mode of operation, as well as a depiction of the various elements of the air supply control device 10 is illustrated therein. The improved air supply control device 10 is configured with an airflow passageway 15 having an air source inlet 18 to supply an air flow, denoted by arrows "C," at a predetermined temperature. The inlet 18 incorporates an air filter (not shown in the figures). In typical configurations, the air supply control device 10 draws outside ambient air into the passageway 15 from an outside location such as an exterior wall or rooftop penthouse of a manufacturing facility. One type of effective filter media device includes a paper, woven, spun, or mesh type of filter, for example, a woven fiberglass panel, such as the model no. V-J #36-150 automatic roll inlet filter available from American Air Filter of Louisville, Ky. The outside incident source air stream is drawn into the air supply control device by at least one variable or fixed speed fan unit 20 that can be selected from any of a wide variety of various types of air movement devices. The coating and/or paint facilities of typical high-volume automotive manufacturing plant can require approximately between 100,000 to 300,000 cubic feet per minute ("CFM") of conditioned air. Thus, air movement devices that are to be compatible for purposes of the present invention are preferably capable of drawing approximately between these amounts of air.

One type of suitable air movement device or fan unit 20 has the capacity to move about 300,000 CFM of conditioned air. This unit 20 includes a fan-motor combination that uses two model no. 7209 variable pitch, variable speed ("VPS") fans. These fans are capable of developing a pressure delta across the fan, equivalent to the weight of a column of about 6 inches of water, to move about 150,000 CFM of air through each fan. Each of the fans are powered by a variable speed 200 horsepower ("HP") triple-phase, alternating current, variable speed electric motor. The model no. 7209 VPS fan equipment is available from the Aerofin Corporation of Lynchburg, Va. The 200 HP electric motor is available from either Seimens of Little Rock, Ark., or from U.S. Motor of St. Louis, Mo. Although not necessary for achieving the benefits of the instant invention, a variable frequency drive device can be employed for use with each of the fans motors to achieve variable speed capability and to experience the cost savings discussed with respect to the cooling unit below.

The device 10 includes a cooling unit 25 that is adapted to cool the air passing through the unit 25 (depicted by arrows "B"). The cooling unit 25 includes a variable speed cooling fluid pump 30 that pumps cooling fluid 40 through a heat exchanger (not shown in detail) in the cooling unit 25. The cooling fluid pump 30 includes a variable speed, multiphase, alternating current 480 volt motor 50 that is, in turn, controlled by a variable frequency drive 55 ("VFD"). Other types of motors are also contemplated for use with the present invention including variations of the described motor as well as single phase, hydraulically, pnuedraulically, and direct current powered motors. The VFD 55 is electronically coupled to the motor 50 by a signal line 60 and is operative to vary the speed of the pump motor 50. VFDs, also known as a type of variable speed drive or VSD, are motor controllers that vary the speed of induction motors such as squirrel cage type motors. VFDs save substantial energy when used in applications for driving variable-torque loads, and can result in reductions in electricity bills in most configurations. The energy savings are realized with variable-torque loads, such as loads created by operation of fans and pumps, because the torque of the load varies as a function of the square of speed of the motor. The horsepower of the motor varies as the cube of its speed. By way of illustration, if the speed of a pump is reduced by 20%, then the horsepower of the motor and the corresponding energy consumption is reduced by about 50%. VFDs have the capability to significantly improve operating efficiency because they operate to condition and convert an alternating current power supply to have a variable voltage and frequency output with the most efficient ratio of potential (volts) to frequency (hertz) as may be needed by the drive motor. VFDs can be retrofitted into existing motor systems, and can operate a wide range of motors ranging in power from about as low as ⅓ horsepower to as much as several thousand horsepower. As a significant advantage over mechanical or hydraulic motor controllers, VFDs can be located and controlled remotely and do not require any mechanical coupling between the motor VFD.

In operation, the cooling unit 25 should be capable of cooling an outside air source having a temperature of about 88 degrees Fahrenheit. In the summer months in parts of North America, the cooling unit 25 should have the capacity to cool the source air from an average summer temperature of about 88 degrees Fahrenheit with an average relative humidity of about 70% to the preferred, predetermined temperature of about 76 degrees Fahrenheit. An outside air supply drawn from other geographic locations having different average summer temperatures will require a cooling unit 25 configured with adequate capacity to cool the incident air stream to the predetermined temperature.

The preferred temperature range of the supplied, conditioned air is approximately between 68 and 76 degrees Fahrenheit. This is the range within which most automotive coatings and paints are best cured and/or dried after application to automotive frames, components, and body panels. Other types of coatings and substances may require other predetermined temperature ranges, which are also contemplated by the present invention.

One type of suitable heat exchanger compatible for use with the cooling unit 25 of the present invention and the preceding parameters includes a cooling coil manufactured by Aerofin Corporation of Lynchburg, Va., and Cambridge, Ontario, Canada. The cooling coils available from Aerofin can be configured in full, ½, and ⅓ circuits, as specified by the manufacturer, and in multiple rows. In the preferred configuration, the coils will be arranged to have a preferred maximum heat exchange rate of approximately 9,712,000 British Thermal Units ("BTUs") per hour for use in cooling about 300,000 CFM of outside air. Preferably the cooling fluid supplied to these types of cooling coils is cooled water supplied from a general purpose, industrial water cooling source available at most large scale, automotive manufacturing and assembly plants. Although many types of manufacturing facilities have available sources of chilled water for use in the air supply and environmental control equipment contemplated by the present invention, boost pumps are typically employed to overcome the pressure or head loss encountered from use of the described types of cooling coils. Gosher of Dry Ridge, Ky. is a manufacturer of several types of pumps compatible for use with the present invention. The Gusher model no. CL-4x6-10SEH-CBM-4A pump is one such model capable of pumping up to about 1,000 gallons of chilled water per minute ("GPM"). The pump can be driven with any of a number of electric motors including the variable torque, 30 HP model E048/S03R295R057R-5 triple phase, alternating current ("AC"), 480 volt motor from U.S. Motor of St. Louis, Mo. One the many types of VFDs available that are compatible for use with the present invention include those manufactured by Allen-Bradley of Milwaukee, Wisconsin. Specifically compatible is the Allen-Bradley model no. A-B 1336F-B025-AA-EN-L4 Plus II Drive, which is compatible for use with 30 HP variable toque, 460 volt, triple phase, AC motor. This type of VFD includes a transistor-transistor-logic ("TTL") interface compatible for use with programmable logic controllers and computers for remote and/or autonomous monitoring, reconfiguration, logging, and routine operation.

The combination of the variable speed pump motor 50 and the VFD 55 creates a significant reduction in required energy costs. In previous air supply control systems, the flow of cooling fluid pumped through prior art cooling units was far less controllable. The pump was usually run at 100% capacity and various valves were adjusted to control the flow of cooling fluid through the cooling unit over a range of between no flow and a maximum of 100%. With the incorporation of a VFD 55 to control the pump motor 50, the speed of the pump 30 and the corresponding flow rate of cooling fluid can be adjusted without the need for valves or the need for continuous pump operation at 100% capacity.

Use of the VFD controlled pump configuration establishes a variable speed capability that saves energy costs. The saving is accomplished, for example, by turning the pump off or running the pump at reduced speeds during periods of lowered demand. By way of illustration, and not for purposes of limitation, when certain types of pump motors are controlled with the VFD to run at about 50%, during period of reduced demand, the pump motor requires only approximately between 15% –20% of the power required to run the motor at 100%. This results in an energy savings of about between 80%–85% over the cost of keeping the pump running continuously at 100%. Additional energy savings accrue when the pump is powered off.

The air supply control device 10 also incorporates a temperature controller having a sensor 70 that is positioned in the air stream exiting the cooling unit 25 to detect the temperature of the air after it has passed through the cooling unit 25. A suitable type of temperature probe sensor is the model no. HP6A17/23A sensor made by Honeywell of York, Pa.

A programmable logic controller 80 ("PLC") is included in the device 10 and is in electronic communication with the temperature sensor 70 and the VFD 55 through signal lines 85, and 90, respectively. The PLC 80 is programmed to actuate machinery, to sample temperature and humidity from the various sensors, including sensor 70, and to monitor operations of some or all components. The PLC 80 is also programmed to vary the speed of the cooling fluid pump motor 50 to adjust the temperature of the air passing through the cooling unit 25 to the predetermined temperature. One example of an acceptable PLC includes the "A" Series PLC, model no. A3CPU manufactured by Mitsubishi Electric of Tokyo, Japan, and Centerville, Ohio, which incorporates various modules including input/output controllers, communication ports, logging modules, monitoring modules, networking modules, and modifiable control program software, all capable of communicating with, controlling, and monitoring various types of machinery and peripheral devices. Various modules can also be incorporated to generate alarm signals to alert users to problems and concerns. The PLC 80 is also compatible for purposes of monitoring the operation of the cooling unit 25 through signal lines and sensors that are not shown in the figures but which are available from the various equipment vendors described herein.

Figure 2:
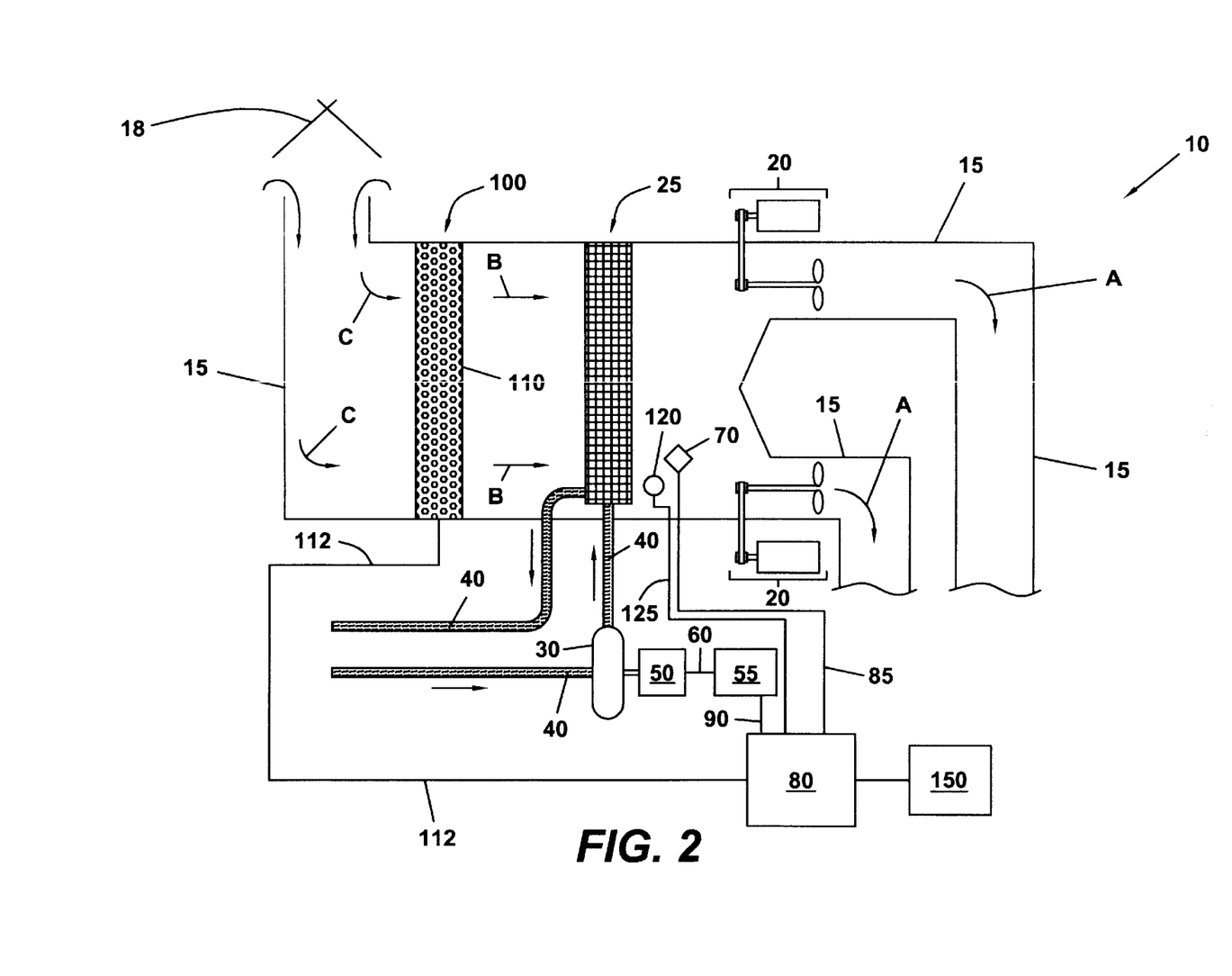
FIG. 2 is a schematic view of a variation of the air supply control device of FIG. 1, shown to further include a humidity control device and humidity sensor.

The present invention is also directed to an air supply control device 10 that is further configured to maintain an air flow at a predetermined temperature and humidity. As shown in FIG. 2, the device 10 in this variation of the preceding embodiment includes a humidity control device 100 that further includes a humidity control unit or humidifier 110 positioned in the air flow denoted by arrows "C". The humidity control unit also includes a humidity sensor 120 coupled to either the humidity control unit 110 or the PLC 80 via a signal control line 125. The humidity control unit 110 is operative to adjust the humidity of the air flow if it deviates from the predetermined humidity. The humidity control unit is capable of autonomous operation and coordinated operation in response to commands from PLC 80 via signal line 112.

Although shown in FIG. 2 in a position that precedes the cooling unit 25 in the air flow passageway 15, the humidifier 110 may be placed at any point in the air stream preceding the temperature sensor 70 and humidity sensor 120. In typical automotive manufacturing coating and painting operations, a relative humidity must be maintained of approximately 70%. In the summer months the average humidity is often just about 70%. However, on rainy days and on days with higher humidity, the cooling unit 25 can be operated to reduce the humidity of the air supplied by the air supply control device 10. In the winter months, when the source of outside air has a humidity or moisture content that is lower than desired, the humidity control unit 110 is operated to add moisture to the air. Alternatively, the humidity control unit 110 can be configured to both humidify and dehumidify the source air. Additionally, since the temperature of the air supply can be changed by adding moisture in an evaporative manner to the moving air stream, the humidity control unit 110 can be actuated to reduce the temperature of the air stream as a backup to or to complement the effect of the cooling unit 25. An illustrative example of a humidity control device adaptable for use with the present invention includes the Aerofil(r) and Fin-Fil(tm) evaporative humidifiers available from Buffalo-Forge Company of Buffalo, N.Y. The preferred humidifier 110 is capable of humidifying incident source air having a relative humidity of about 50% and with the previously described parameters, to have a relative humidity of about 70%. A preferred configuration of the Buffalo-Forge humidification unit has a 7 foot height, a 37 foot-6 inch length, and a 14 inch depth, and uses the removable Glasdek type of evaporative humidification media (not shown) also available from Buffalo-Forge and other humidification equipment vendors.

Figure 3:
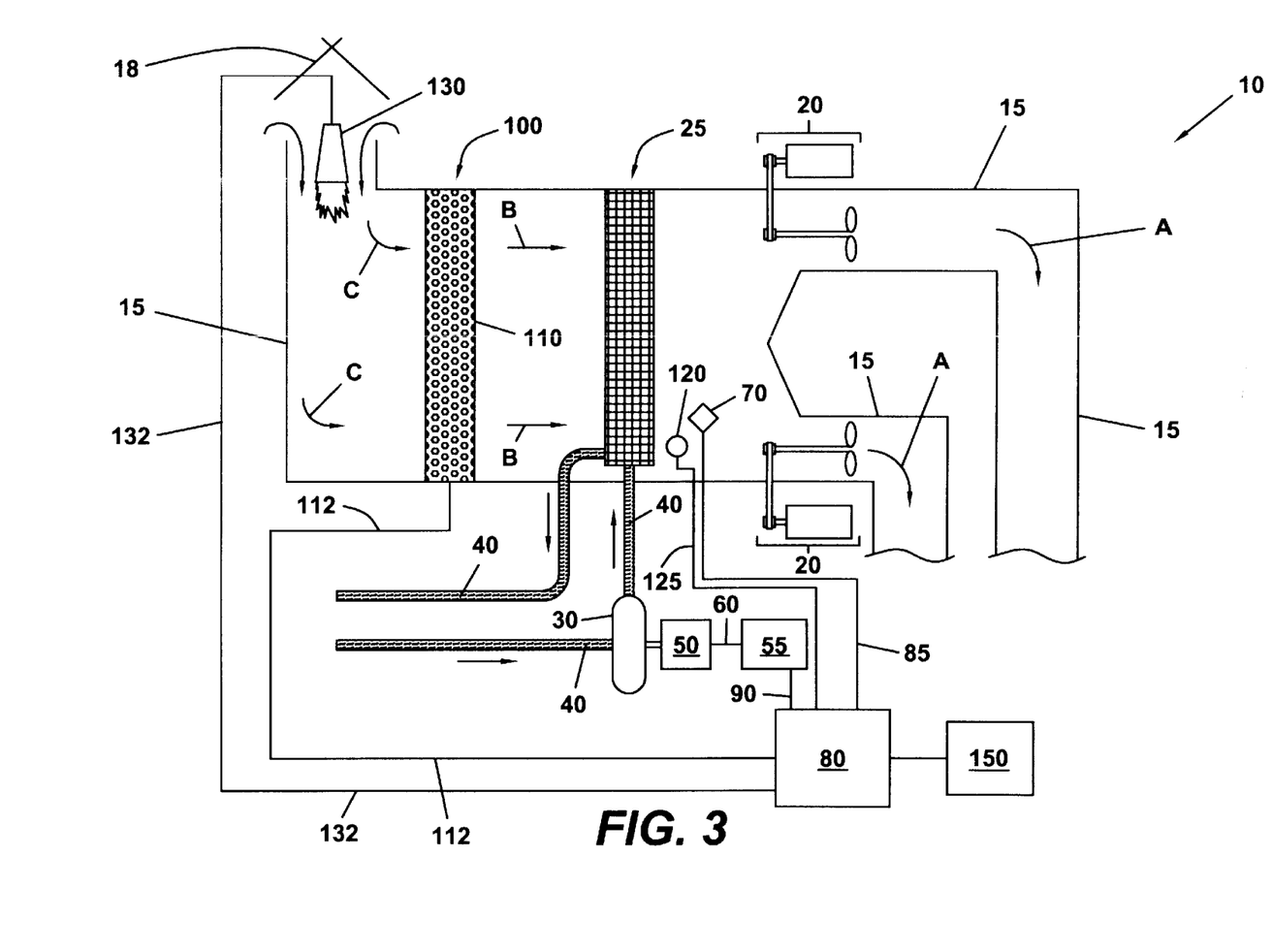
FIG. 3 is a schematic view of a variation of the air supply control device of FIGS. 1–2, shown to further include a heating unit in operation.

As can be observed by reference to FIG. 3, in variations of the preceding embodiments, the device 10 further incorporates a heating unit 130 that may operate independently with its own temperature sensor (not shown) or that may be electronically coupled to the PLC 80 for integrated operation. The heating unit 130 is usually placed proximate to the air inlet 18 and before the humidity control unit 110 and the cooling unit 25. This position is important so that the cooling unit 25 and humidity control unit 110 can be operated to cool and humidify the air in the event that the heating unit 130 overheats and/or dries out the air supply. The heating unit 130 may include an electric or gas or oil fired heating element that can be seen in operation in FIG. 3. The large volume of air typically supplied by air control supply devices 10 for use in automotive coating and painting operations requires that the heating unit 130 have a sufficient capacity. Typically, the large capacity requirements can most efficiently be satisfied by natural gas and/or propane burners, which can heat large volumes of air rapidly and efficiently. In one variation of the preceding embodiments, the heating unit 130 operates independently of the PLC 80 to heat the incoming air whenever the air drops below the desired predetermined temperature. The Maxon Corporation of Muncie, Ind., manufactures a suitable gas fired heating unit sold under the Series "LV" Airflo(r) line burners for direct-fired air heating of variable air volumes. Preferably, for improved heating control, the heating unit 130 is configured with a pre-burner for initial heating and an after burner for final heating of the incident source air stream. For these purposes, a Maxon model no. NP-1 75 foot, 6 inch long pre burner can be used that is capable of imparting up to 41,800,000 BTUs per hour of added heat. A suitable type of after burner is the Maxon NP-1 7 foot long burner with a maximum heat output of about 3,850,000 BTUs per hour.

To avoid overheating, the heating unit 130 preferably incorporates a variable heat output capability that allows a metered input of heat to the incoming air stream. Variable quantities of heat can be added to the air stream to prevent overheating, which would trigger the need for operation of the cooling unit 25 to cool the air back down to the predetermined temperature before supply of the conditioned air stream "A" to the end-user manufacturing operation. As the temperature of the outside source air rises to, meets, and exceeds the predetermined temperature, the heating unit 130 gradually reduces its heat output until a minimized amount or no heat is added to the incoming air stream. In variations of the preceding embodiments, the heating unit 130 does not operate autonomously. Instead, its operation is controlled by the PLC 80 via signal line 132 to more efficiently integrate monitoring of energy consumption and its routine operation with the other components of the air supply control device 10.

Many different heating, cooling, and conditioning capacities and/or capabilities may be suitable for implementation of the features of the present invention. The desirable capacities and capabilities will usually be determined based upon the climate of the geographic location of the ambient air supply. For example, in North American automotive manufacturing operations, the heating unit 130 should have a capacity sufficient to heat source air as cold as approximately −4 degrees Fahrenheit, on average, during winter months. During spring, fall, and cool summer months, outside air of about −4 to 65 degrees Fahrenheit must be heated to the predetermined, desired temperature of about 68 degrees Fahrenheit for the previously described air supply volume requirements. Although the present invention primarily discusses the use of the temperature sensor 70 and the humidity sensor 120, many other types of sensors are suitable for use with the present invention for purposes of further refining the efficiency, capabilities, and capacities of the instant invention. Other types of sensors include, for example, sensors than can measure, monitor, transmit, and record several important parameters. The parameters include pressure, velocity, mass flow rate, and rates of change of the various configurations of the components of the device 10 and the parameters of the air moving through the various stages and sections of the device 10.

Ideally, the air supply control device 10 is configured for the simultaneous operation of the heating, cooling, and/or humidity control units 130, 25, 110. This configuration establishes the capability to accommodate a delayed system response time, also referred to as a latency period of time. The response or latency time period is the time between the instant when a sensor detects a variation from the predetermined temperature and humidity, and the instant at which the air supplied by the device meets the desired predetermined temperature and humidity. The time delay includes the time needed for the PLC 80 to register the temperature and humidity readings from the sensors 70, 120 and to initiate any needed cooling, heating, and/or humidification, which will adjust the temperature of the air to the predetermined temperature. The latency time interval is proportional to the aggregate response time. The aggregate or total response time includes the individual response times of: (1) the incident source air stream and corresponding initial conditions and the rate of temperature change, (2) the PLC 80, (3) the sensors 70, 120, (4) each of the heating, cooling, and humidification units 25, 110, 130, and (5) the response times of the other various components of the device 10. As can be appreciated by one with skill in the art, the response time of the incident source air stream is also dependant upon the initial temperature, pressure, and humidity conditions of the source air and is also proportional the mass flow rate of the air stream.

The aggregate response times must be determined for the selected combination of air mass flow rate, input air source temperature and humidity, and the respective capacities of the heating unit 130, the cooling unit 25, and the humidity control unit 110. For the typical volumes of air that must move through the air supply control device 10 to provide a controlled air supply to an average automotive coating and painting facility, the response time is not instantaneous. Instead, a certain amount of time must pass before the sensors 70, 120 can detect variations in the air flow temperature resulting from activation of the heating unit 130, the cooling unit 25, and the humidity control unit 110. Accordingly, once the response time determination has been ascertained for the selected combination of specific components and the corresponding mass flow rate, the PLC 80 is programmed to incorporate the corresponding latency time period. In this way, the air supply control device 10 can be tuned to avoid excessive heating, cooling, and humidification of the air supply.

For example, the PLC 80 may detect a deviation in the air flow temperature from the predetermined value of 68 degrees Fahrenheit. By way of illustration, if the outside air temperature has dropped below 68 degrees, such as during spring, fall, winter, or cool summer time operation, then the heating unit 130 may be cycled into operation. However, it would be inefficient to initially power on the heating unit 130 to its maximum setting, if only a small amount of heat must be added to the incident air stream to bring its temperature to within acceptable tolerance limits around the desired temperature of about 68 degrees Fahrenheit.

Similarly, if the heat sensor 70 detects a rise in temperature in the air stream, then the cooling unit 25 can be cycled into operation. Here again, initial full power operation would present an inefficient use of energy if only a small amount of heat must be removed from the incident air stream to bring its temperature to within acceptable tolerances. Accordingly, it would be desirable to cycle the cooling unit 25 into operation at less than full capacity. The condition of the incident air stream may require the air supply control device 10 to cycle either the cooling unit 25, the humidity control unit 110, or the heating unit 130 into operation, or some combination thereof. If full operation of any of the units is initiated, then over heating, over cooling, and over humidification of the incident air stream can occur. If overheating occurs, then the cooling unit 25 must be cycled into operation to cool the overheated air before it is supplied to the intended manufacturing process. This results in an unnecessary energy expenditure that can be avoided by accounting for the response time latency period and the capability taught by the present invention to initiate less than full power operation of the cooling unit 25 and other components of the air supply control device 10. Although use of the VFD 55 is primarily emphasized in connection with the description of the cooling pump motor 50, the present invention advocates similar use of VFDs for all pump motor operations disclosed in connection with other components and features, including for example the humidification control unit 100 and the air moving device 20.

Figure 4:
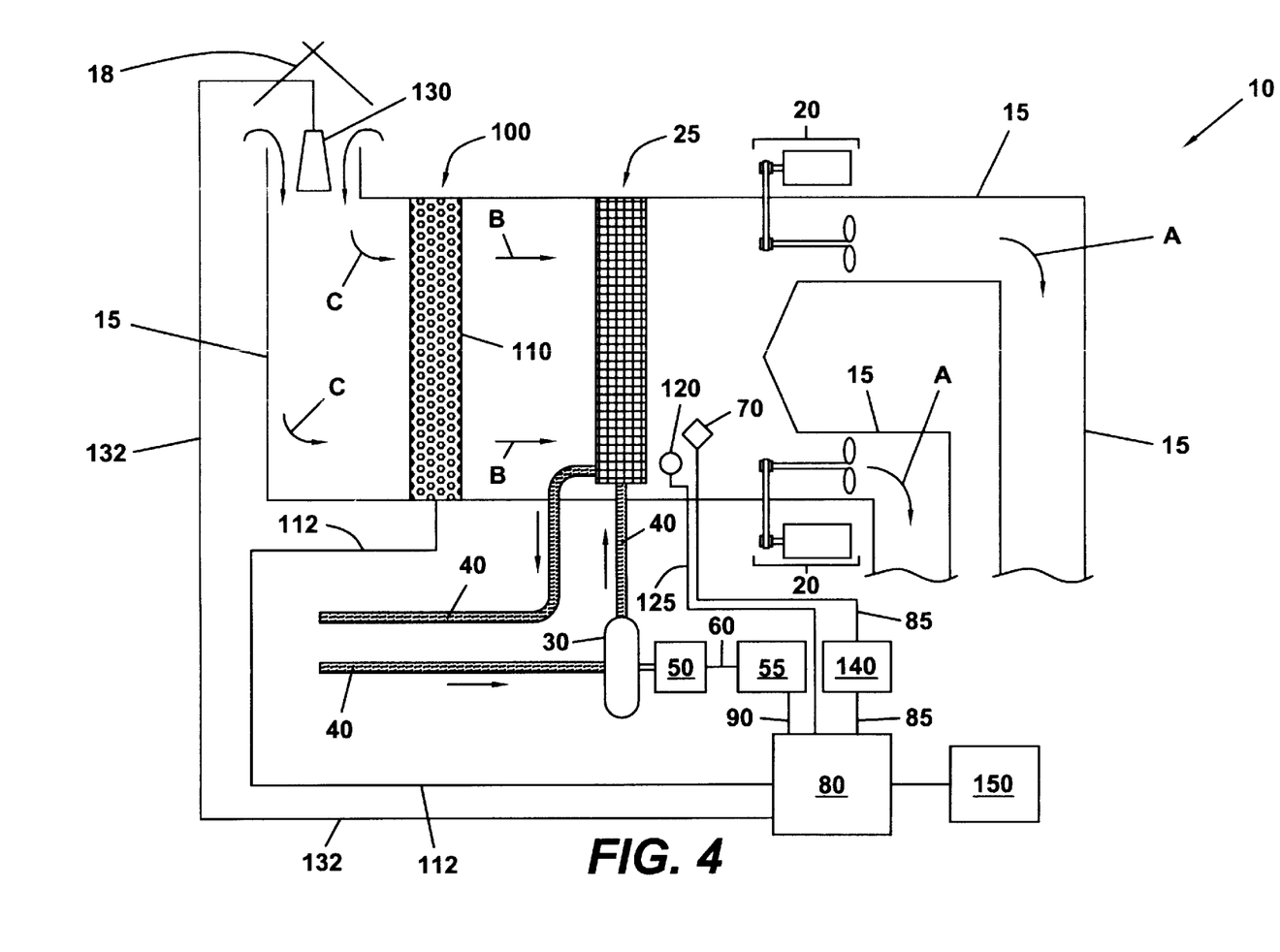
FIG. 4 is a schematic view of a variation of the air supply control device of FIGS. 1–3, shown to further include a thermostat.

As illustrated in FIG. 4, the preceding embodiments of the present invention also contemplate a variation that includes a temperature controller or thermostat 140 having a temperature selector configured to be set to the predetermined temperature. The temperature controller may be remote from the sensor 70 or integrally formed as part of the sensor 70. The PLC 80 in this variation is in electronic communication with the controller or thermostat 140, the temperature sensor 70, and the VFD 55. The PLC 80 is programmed to vary the speed of the cooling fluid pump 30 to adjust the temperature of the air passing through the cooling unit 25 when the predetermined temperature is different from the temperature indicated by the temperature sensor 70. As with the temperature sensor 70, Honeywell of York, Pa. manufactures a model no. UDC3000 Universal Digital Controller that is acceptable as a thermostat or temperature controller 140 for use with the present invention.

In another variation of the preceding embodiments, the PLC 80 is in electronic communication with the temperature sensor 70 and the VFD 55, and it includes an integral temperature selector that is adapted to be programmed to the predetermined temperature. Such integral devices are available from Mitsubishi Electric of Circleville, Ohio. The PLC 80 is programmed to vary the speed of the cooling fluid pump motor 50 by communication with the VFD 55 to adjust the amount of cooling fluid pumped. This, in turn, varies the flow through the heat exchanger of cooling unit 25 to vary the temperature of the air passing through it to the predetermined temperature as it is preset by the integral temperature selector. Each of the preceding embodiments and variations also contemplate selecting the PLC 80 to be capable of electronic communication with a manufacturing plant or facilities computer and/or a network 150 that is configured to monitor and reprogram the PLC 80.

Figure 5:
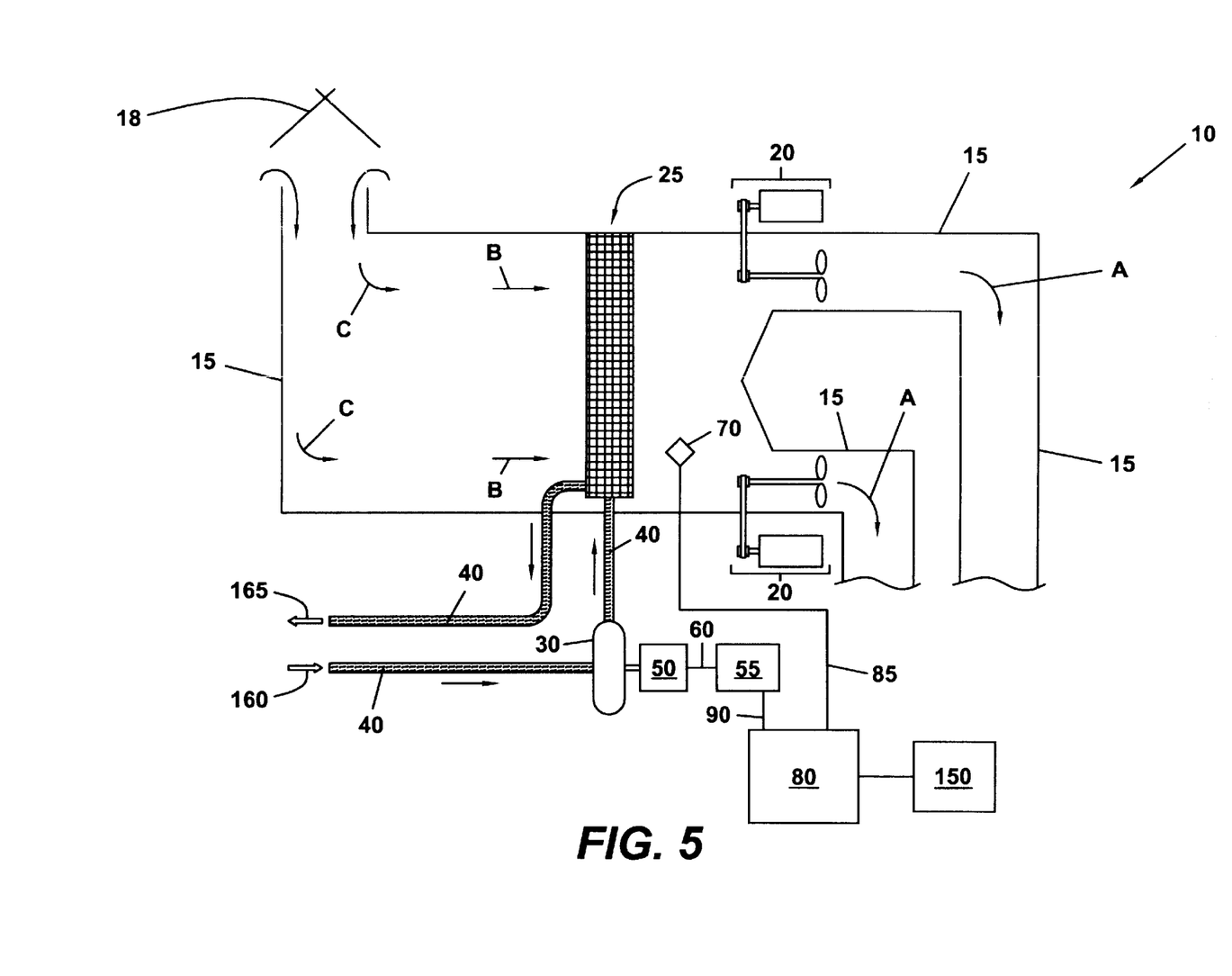
FIG. 5 is a schematic view of a variation of the air supply control device of FIG. 1, wherein the device is connected to a pressurized cooling fluid supply source.

The present invention is also directed to the VFD controlled air cooling unit 25 of preceding embodiments and variations for maintaining the temperature of an air flow at a predetermined temperature. In this variation, shown in FIG. 5, the variable speed cooling fluid booster pump 30 is included and is in fluid communication with a pressurized cooling fluid supply source 160 and return 165. The VFD 55 is in electronic communication with the motor 50 driven pump 30 and configured to vary the cooling fluid 40 flow rate through the pump 30. This variation of the preceding embodiments of the invention also includes the temperature sensor 70 positioned to detect the temperature of the air after it has passed through the cooling unit 25 and the PLC 80 adapted to communicate electronically with the temperature sensor 70 and the VFD 55. The PLC 80 is programmed to adjust the VFD 55 to increase and decrease the speed of the motor 50 that powers the cooling fluid pump 30. This arrangement boosts the cooling fluid pressure to vary the cooling fluid 40 flow rate through the heat exchanger of the cooling unit 25 to thereby maintain the temperature of the air passing through the cooling unit 25 at the predetermined temperature.

Figure 6:
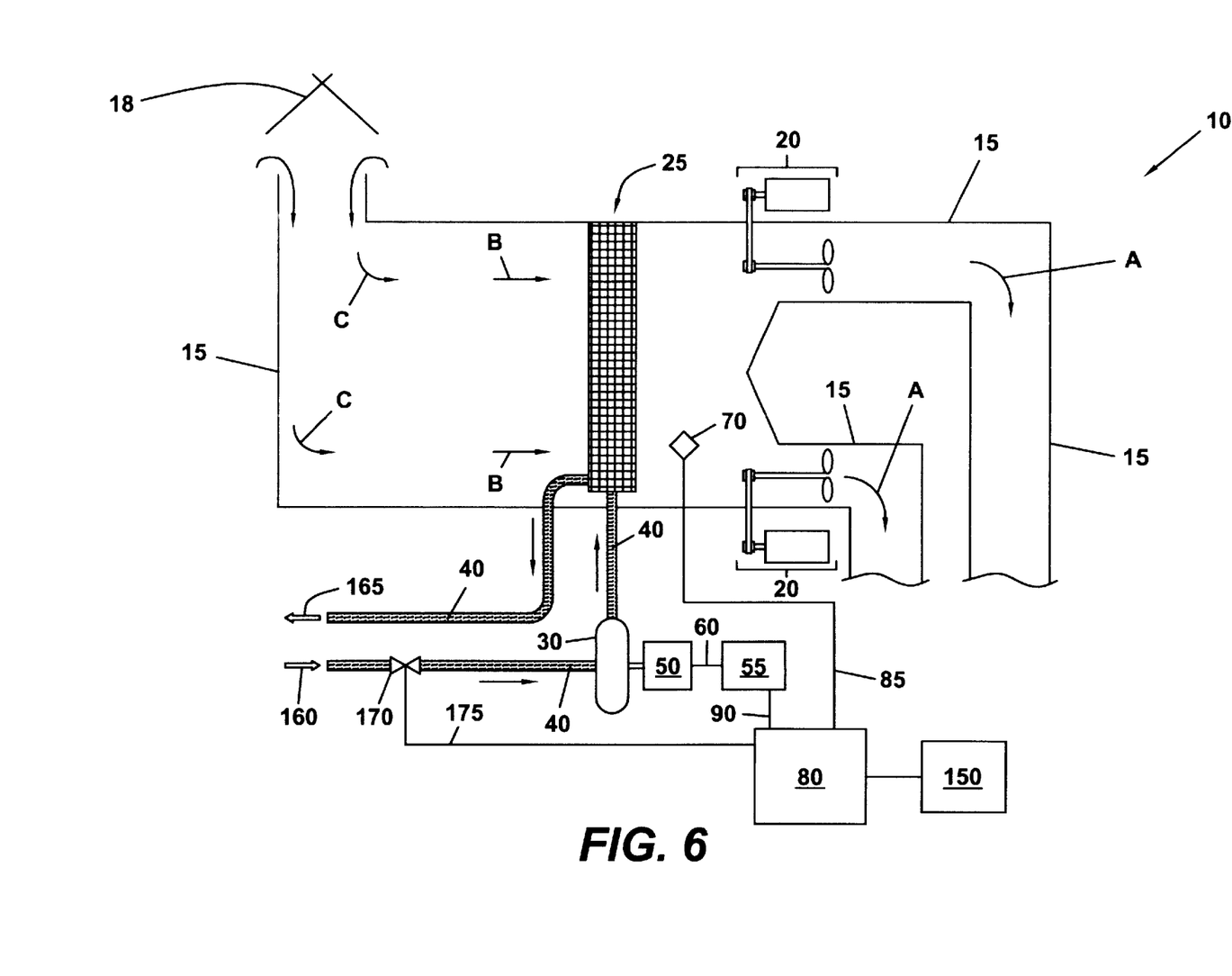
FIG. 6 is a schematic view of a variation of the air supply control device of FIG. 5, shown to further include a check valve.

In another variation of the preferred embodiments of the instant invention, illustrated in FIG. 6, the air supply control device 10 for maintaining the air flow at the predetermined temperature incorporates the cooling fluid source 160 that supplies pressurized cooled liquid 40 to the cooling unit 25, which is returned to return 165. The cooling unit 25 is adapted to include the variable speed, cooling fluid boost pump 30 in fluid communication with an automatically and/or electronically actuatable check valve 170 that is connected to the cooling fluid source 160. The check valve 170 is preferably in electronic communication with the PLC 80 and is of the type that can be obtained from, for example, Nibco of Elkhart, Ind. For compatibility with the preceding embodiments and variations, the preferred check valve 170 is an 8 inch Nibco model no. LD200 lug butterfly valve with the Nibco model no. EDA350 Elomatic Double Acting Pneumatic Actuator with the Nibco model no. SVN-4-120, 4-way NEMA 4 Solenoid devices are also adequate for purposes of the present invention. Preferably, the actuator further includes a Nibco Moniteur(tm) limit switch and is selected to have an operational mode that is closed to fluid flow when no power is supplied to the actuator, and which opens upon the application of power. In operation during times of decreased cooling demand, the check valve 170 can be closed by the PLC 80 to discontinue operation of the cooling unit 25.

The VFD 55 is also included and is electrically connected to the motor 50 that powers the pump 30 and it is adapted to vary its speed in response to commands from the PLC 80. This variation of the device 10 further includes the temperature sensor 70 positioned to detect the temperature of the air after it has passed through the cooling unit 25. Also, the PLC 80 is in electronic communication via signal line 175 with the check valve 170, as well as the temperature sensor 70 via line 85, and the VFD 55 via line 90. The PLC 80 is programmed to actuate the check valve 170 and to vary the speed of the cooling fluid pump to adjust the temperature of the air passing through the cooling unit 25 to the predetermined temperature.

With reference to FIGS. 1–6, the present invention is also directed to a method 200 for maintaining at a predetermined temperature an air flow moving through the air supply control device 10, which incorporates embodiments and variations described previously. The method 200 includes, among other steps, the steps of monitoring the temperature of the air flow "A" leaving the cooling unit 25. The method 200 also includes the step of decreasing and increasing the temperature of the air flow "A" if it deviates from the predetermined temperature. To accomplish this, the PLC 80 sends a signal to the VFD 55 to increase or decrease the speed of the variable speed cooling fluid pump 30 to change the cooling rate of the cooling unit 25.

Figure 7:
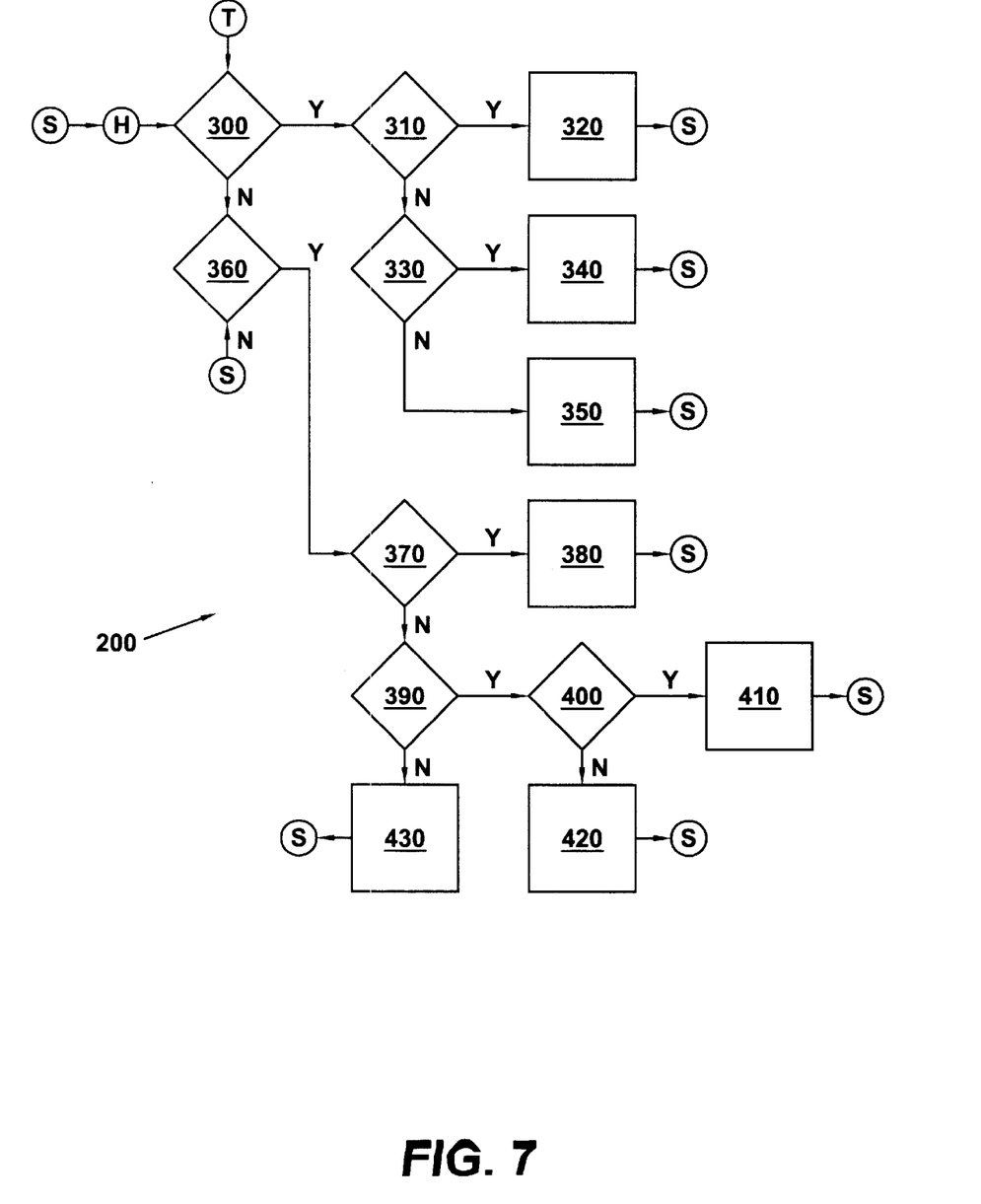
FIG. 7 is a schematic flow chart describing operational capabilities of the air supply control device of FIGS. 1–6.
Figure 8:
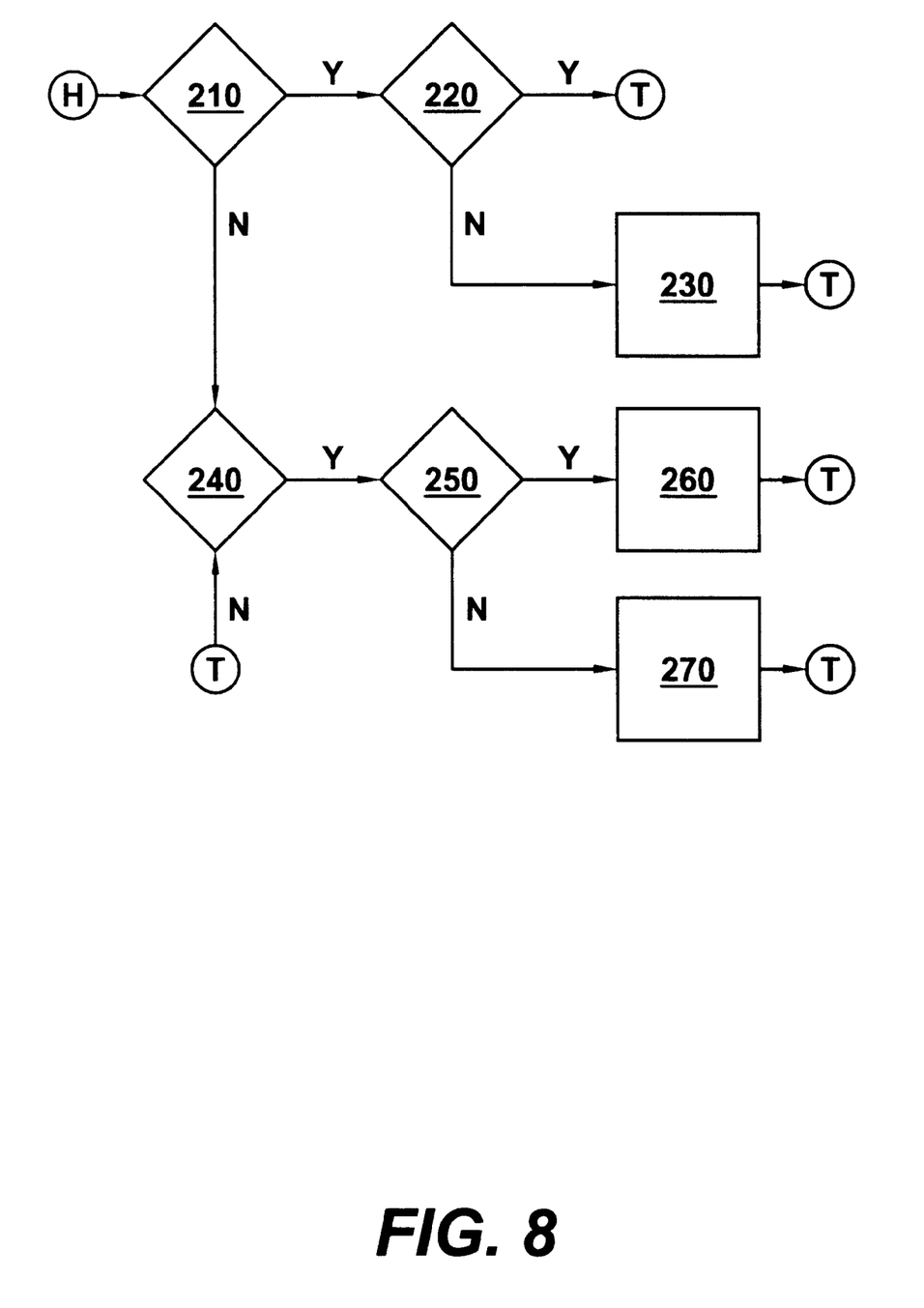
FIG 8 is a schematic flow chart describing additional operational capabilities of the air supply control device of FIGS. 1–6.

The PLC 80 programming further includes the steps of method 200 as shown in FIG. 7 wherein the PLC 80 starts processing at starting point "S". With reference also to FIG. 8, the PLC 80 transfers program control operation to block "H" for monitoring and actuation of the humidification control unit 110, if necessary. The method starts with monitoring of the relative humidity. This is because adding moisture to the incident source air stream, denoted by arrows "C" in FIGS. 1-6, can reduce the temperature of the supply air stream "A."

Thus, at step 210 in FIG. 8, the PLC 80 programming polls the humidity sensor 120 and ascertains whether the relative humidity of the air stream "A" is equal to or exceeds the predetermined or desired relative humidity of the supply air stream. If so, then operation proceeds to step 220 where the PLC 80 determines whether the humidification control unit 110 is off. If it is off, humidity cannot be reduced by actuation of the humidity control unit 110 (unless a variation includes a dehumidification capability mentioned above) and program control advances to step "T" in FIG. 7. If operating, processing by the PLC 80 advances to step 230 where the PLC 80 decreases the output of the humidification unit 110, and if required, cycles the unit 110 off. The decrease and/or discontinued operation can be effected by electronically operated valves and/or by selective operation of the VFD(s) and pump motor(s), not shown in the figures, of the humidification control unit 110 as described earlier.

If at step 210, the relative humidity does not exceed the predetermined humidity, then processing proceeds to step 240 where the PLC 80 decides whether the sensed relative humidity is less than the predetermined humidity. If less than the desired target, then at step 250 the PLC 80 checks whether the humidifier is operating. If so, then the PLC 80 executes process 260 to increase output of the humidification control unit 110. Then control returns to step "T" in FIG. 7. If the humidifier 110 is not operating, then the PLC 80 executes process 270 to actuate the humidification control unit 110 to begin moisturizing the air stream. Control then proceeds to step "T" as shown in FIG. 7. From step "T", control advances to decision step 300 and the temperature of the air stream "A" (see, FIGS. 1–6) is checked by PLC 80 polling sensor 70 to determine whether it is less than to the predetermined temperature. If the air stream temperature less than the predetermined temperature, then the PLC 80 advances control to decision step 310 to determine if the motor 50 of pump 30 is circulating. If so, then process step 320 executes in PLC 80 to incrementally decrease the speed of motor 50 and cooling pump 30 by actuating the VFD 55 to reduce the current to the motor 50. Processing returns to programming start step "S".

From step "T", control advances to decision step 300 and the temperature of the air stream "A" (see, FIGS. 1 and 2) is checked by PLC 80 polling sensor 70 to determine whether it is less than to the predetermined temperature. If the air stream temperature is less than the predetermined temperature, then the PLC 80 advances control to decision step 310 to determine if the motor 50 of pump 30 is circulating. If so, then process step 320 executes in PLC 80 to incrementally decrease the speed of motor 50 and cooling pump 30 by actuating the VFD 55 to reduce the current to the motor 50. Processing returns to programming start step "S".

If at step 310 the cooling unit pump 30 is not operating, then control proceeds to decision step 330 to check if check valve 170 is open and, if it is PLC 80 closes it. Then PLC 80 determines if heating unit 130 is operating. If so, then the PLC 80 executes process step 340 to increase the heat output of heating unit 130 and control returns to step "S". If not, then control passes to process step 350 to turn on the heating unit 130, with control then returning to step "S".

If at step 300 the air stream temperature is not less than the predetermined temperature, decision step 360 executes to check if the air stream temperature exceeds the predetermined temperature. If not, then the temperature of air stream "A" is equal to the predetermined temperature and processing returns to step "S" and begins again.

If the temperature check of sensor 70 by PLC 80 performed at step 360 reveals that the temperature is too high, then decision step 370 establishes whether the heating unit 130 is operating. If it is, then PLC 80 executes process step 380 to decrease the output of the heating unit 130; control next returns to step "S". Otherwise control proceeds to decision step 390 where the PLC 80 determines if the check valve 170 is open. If it is open, the decision step 400 is processed to check if the motor 50 of pump 30 is running. If so, then PLC 80 executes process step 410 and actuates VFD 55 to increase motor the output of motor 50, to increase the cooling rate of the cooling unit 25. PLC 80 then returns its control to step "S". If at decision step 400, the cooling pump 30 is not circulating cooling fluid, then process step 420 executes to actuate the pump-motor-VFD 55, 50, 30 combination to increase the cooling output of the cooling unit 25.

In the alternative, if at decision step 390, the check valve 170 is not open, then the PLC 80 executes process step 430 to open the check valve 170. This begins circulation of the cooling fluid 40 in the cooling unit 25 under the pressure of the chilled water source 160 without operating the pump-motor-VFD 55, 50, 30 combination until a continued need for increased cooling is detected in later cycles of the PLC programming code.

As can be appreciated by those with skill in the art, a large number of possible permutations, combinations, and reorganized sequences of the preceding steps can be employed with equally suitable results, and all are believed to be contemplated and claimed by the present invention. The preceding sequence of processing steps is merely intended to demonstrate one of a number of possible programming sequences that can be programmed into the components that form the PLC 80 described above.

Numerous modifications and variations of the preferred embodiments disclosed herein will be apparent to those skilled in the art. For example, although specific embodiments have been described in detail, those with skill in the art can understand that the preceding embodiments and variations can be scaled up or down for larger and smaller scale air supply applications, respectively. Accordingly, it is to be understood that the practice of these modifications and variations and the equivalents thereof, are within the spirit and scope of the invention as defined in the following claims.

I claim:

1. An air supply control device for maintaining an air flow at a predetermined temperature, comprising:
    a cooling unit adapted to cool the air passing through the unit that includes a variable speed cooling fluid pump;
    a variable frequency drive electrically connected to the pump and adapted to vary the speed of the pump;
    a temperature sensor positioned to detect the temperature of the air after it has passed through the cooling unit; and
    a programmable logic controller in electronic communication with the temperature sensor and the variable frequency drive and programmed to vary the speed of the cooling fluid pump during operation thereof, thereby varying the rate at which cooling fluid is supplied to the cooling unit and causing a resultant adjustment of the temperature of the air passing through the cooling unit to the predetermined temperature.

2. The air supply control device according to claim 1, that further comprises:
    a heating unit electronically coupled to the programmable logic controller and operative to heat the air flow in response to the programmable logic controller.

3. The air supply control device according to claim 1, wherein the programmable logic controller is programmed to incorporate a latency period of time between events where the speed of the cooling pump motor is adjusted and wherein the latency period of time is proportional to the response time of the cooling unit.

4. An air supply control device according to claim 1, further comprising a humidity control unit positioned in the air flow that includes an air humidifier and a humidity sensor operative to adjust and maintain the humidity of the air flow if it deviates from a predetermined humidity.

5. An air supply control device according to claim 1, further comprising a thermostat having a temperature selector configured to be set to said predetermined temperature.

6. An air supply control device according to claim 5, wherein said programmable logic controller is in electronic communication with said thermostat, said programmable logic controller programmed to adjust the temperature of the air when said predetermined temperature as indicated by said temperature selector is different from the temperature indicated by said temperature sensor.

7. An air supply control device according to claim 1, further comprising a temperature selector located on said programmable logic controller, said temperature selector adapted to be programmed to said predetermined temperature.

8. An air supply control device according to claim 1, further comprising a computer in electronic communication with said programmable logic controller, said computer operative to monitor the temperature control system and to reprogram said programmable logic controller.

9. An air supply control device according to claim 1, further comprising a source of pressurized cooling fluid in communication with said cooling fluid pump.

10. An air supply control device according to claim 9, further comprising a check valve located between said source of pressurized cooling fluid and said cooling fluid pump, actuation of said check valve controlled by said programmable logic controller.

11. An air supply control device for maintaining an air flow at a predetermined temperature and humidity, comprising:
    a cooling unit adapted to cool the air passing through the unit that includes a variable speed cooling fluid pump;
    a variable frequency drive electrically connected to the pump and adapted to vary the speed of the pump;
    a temperature sensor positioned to detect the temperature of the air after it has passed through the cooling unit;
    a programmable logic controller in electronic communication with the temperature sensor and the variable frequency drive and programmed to vary the speed of the cooling fluid pump during operation thereof, thereby varying the rate at which cooling fluid is supplied to the cooling unit and causing a resultant adjustment of the temperature of the air passing through the cooling unit to the predetermined temperature; and
    a humidity control unit positioned in the air flow that includes an air humidifier and a humidity sensor operative to adjust the humidity of the air flow if it deviates from the predetermined humidity.

12. An air supply control device for maintaining an air flow at a predetermined temperature, comprising:
    a cooling unit adapted to cool the air passing through the unit that includes a variable speed cooling fluid pump;
    a variable frequency drive electrically connected to the pump and adapted to vary the speed of the pump;
    a temperature sensor positioned to detect the temperature of the air after it has passed through the cooling unit; and
    a programmable logic controller in electronic communication with the temperature sensor and the variable frequency drive, that includes a temperature selector adapted to be programmed to the predetermined temperature, and wherein the programmable logic controller is programmed to vary the speed of the cooling fluid pump to adjust the temperature of the air passing through the cooling unit to the predetermined temperature.

13. An air supply control device for maintaining an air flow at a predetermined temperature, comprising:
    a cooling unit adapted to cool the air passing through the unit that includes a variable speed cooling fluid pump;
    a variable frequency drive electrically connected to the pump and adapted to vary the speed of the pump;
    a temperature sensor positioned to detect the temperature of the air after it has passed through the cooling unit;
    a programmable logic controller in electronic communication with the temperature sensor, the variable frequency drive, and a computer, and programmed to vary the speed of the cooling fluid pump to adjust the temperature of the air passing through the cooling unit to the predetermined temperature; and
    wherein the computer is operative to monitor the temperature control system and to reprogram the programmable logic controller.

14. A method for maintaining at a predetermined temperature an air flow moving through an air supply control device that incorporates a cooling unit having a variable speed, cooling fluid pump motor controlled by a variable frequency drive responsive to a programmable logic controller programmed to sense the temperature indicated by a sensor positioned proximate to the flowing air and to adjust the pump motor speed during the operation thereof to vary the cooling rate of the cooling unit, and that includes the steps of:

(a) monitoring the temperature of the air flow leaving the cooling unit with the programmable logic controller detecting the temperature indicated by the sensor;

(b) increasing the temperature of the air flow if it falls below the predetermined temperature wherein the programmable logic controller sends a signal to the variable frequency drive to decrease the speed of the variable speed cooling fluid pump to reduce the cooling rate of the cooling unit; and (c) decreasing the temperature of the air flow if it exceeds the predetermined temperature wherein the programmable logic controller sends a signal to the variable frequency drive to increase the speed of the variable speed cooling fluid pump to increase the cooling rate of the cooling unit.

* * * * *